Figure 1:
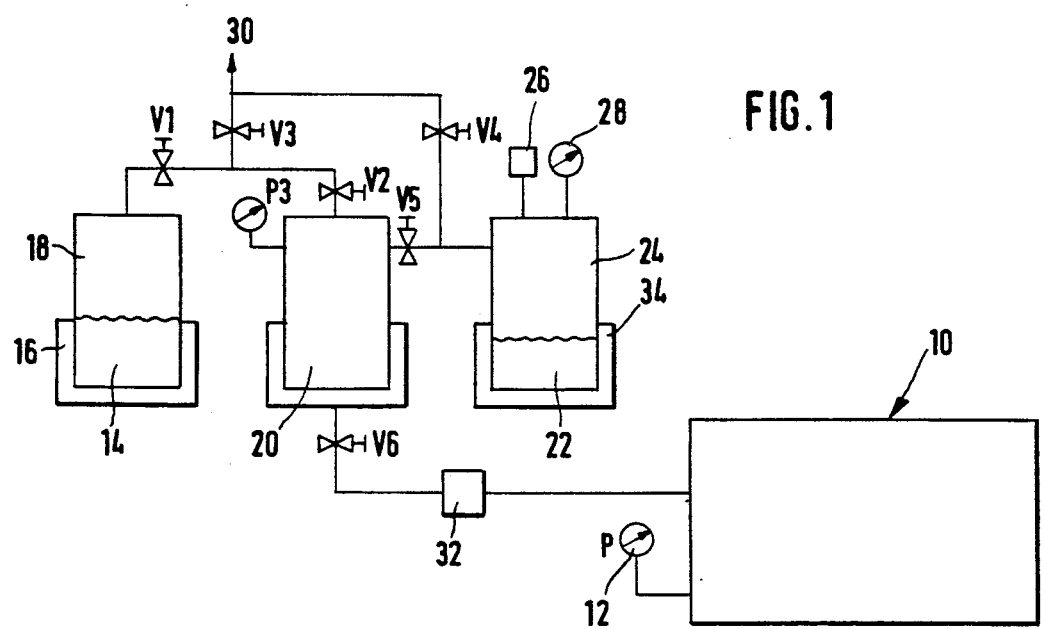

United States Patent [19]

Voss et al.

[11] Patent Number: 5,220,574

[45] Date of Patent: Jun. 15, 1993

[54] EXCIMER LASER WITH HYDROGEN CHLORIDE AND METHOD FOR PRODUCING HYDROGEN CHLORIDE FOR AN EXCIMER LASER

[75] Inventors: Frank Voss; Dirk Basting; A. Meller, all of Göttingen, Fed. Rep. of Germany

[73] Assignee: Lambda Physik Gesellschaft zur Herstellung von Lasern mbH, Gottingen, Fed. Rep. of Germany

[21] Appl. No.: 794,387

[22] Filed: Nov. 19, 1991

[30] Foreign Application Priority Data

Nov. 20, 1990 [DE] Fed. Rep. of Germany ....... 4036963

[51] Int. Cl.$^5$ .............................................. H01S 3/22
[52] U.S. Cl. ......................................... 372/57; 372/59
[58] Field of Search ................................. 372/57, 59

[56] References Cited

U.S. PATENT DOCUMENTS 4,958,356 9/1990 Tanuma .............................. 372/57

OTHER PUBLICATIONS

R. Salimbeni et al., "XeCl Laser Operation With Liquid Chlorine Donors: an Experimental Investigation on the Gas Composition," 39 *Optics Communications* 75–78 (1981).

Pummer, H, et al., "Kommerzielle Excimerlaser," Laswer-Anwendung, Exhibit of Laser and Optoelektronic of May 3, 1985.

*Primary Examiner*—Léon Scott, Jr.
*Attorney, Agent, or Firm*—Woodard, Emhardt, Naughton, Moriarty & McNett

[57] ABSTRACT

An excimer laser having a chamber (10) in which a gas-discharge is performed with participation of hydrogen-chloride comprises means with which the hydrogen chloride is formed by hydrolysis.

7 Claims, 2 Drawing Sheets

EXCIMER LASER WITH HYDROGEN CHLORIDE AND METHOD FOR PRODUCING HYDROGEN CHLORIDE FOR AN EXCIMER LASER

The invention relates to an excimer laser comprising a chamber in which a gas discharge is carried out with participation of hydrogen chloride (HCl), and a method for producing hydrogen chloride for an excimer laser.

As is known, in excimer lasers a laser-active medium is generated in that in the plasma of a gas discharge with participation of inert gas atoms and hydrogen halide molecules (and other reactants) highly stimulated excimer molecules are formed.

Due to the extreme reactivity of these compounds, the use in particular of the halogens and hydrogen halides (for example $F_2$ and HCl) is very complicated. The reactive gases must be prepared with the aid of considerable safety devices and their handling outside and inside the laser is correspondingly involved and requires expensive components.

An excimer laser is known from U.S. Pat. No. 4,958,356 in which hydrogen chloride (HCl) is produced by conducting gaseous hydrogen ($H_2$) over a metal chloride present in solid phase. HCl is formed and is used for the excimer laser.

In this case, a heterogeneous gas/solid reaction is carried out. The gas is hydrogen ($H_2$) and the solid is a metal halide. The reaction is initiated thermally, i.e. the metal halide is correspondingly heated in order to carry out the reaction. This therefore involves a heterogeneous surface reaction in which the yield of HCl is relatively low. In addition, this prior art has the disadvantage that the hygroscopicity of the metal chlorides presents a problem.

The invention is based on the problem of providing an excimer laser and a method for supplying gas to such a laser in which hydrogen chloride can be made in simple manner in large quantities with low expenditure.

This problem is solved by the invention in that a hydrolysis of a halide is performed for producing the hydrogen chloride.

Historically, "hydrolysis" means the splitting of covalence bonds by reaction with water. In the prior art referred to at the beginning such a hydrolysis of a halide is not performed because gaseous hydrogen ($H_2$) is used as reactant.

To achieve a particularly high yield of hydrogen chloride (HCl) and thus permit the operation of large-size excimer lasers for long periods of time, according to a preferred development of the invention the hydrolysis takes place in homogeneous liquid phase. Preferably, $SiCl_4$ or $POCl_3$ are provided as halide. A homogeneous liquid phase is also present when one of the reactants is in liquid form and the other reactant in a form such that it consists of extremely finely dispersed drippable-liquid particles.

The halide used is preferably inorganic.

Alternatively, the hydrolysis can also take place in homogeneous gas phase by reaction of reactants (for example $SiCl_4$ and $H_2O$) brought together in predetermined partial pressures. Here, according to a further preferred development of the invention socalled supply volumes are dispensed with, i.e. for the hydrolysis the halide, for example in vapour or gaseous form, flows directly over a proton-emitting substance, forming HCl gas, and said gas can be directly introduced into the gas discharge chamber of the laser. For example, $SiCl_4$ vapour can be conducted over a water-charged store, the $SiCl_4$ gas being hydrolyzed by the water and the HCl gas thus obtained can be directly introduced into the gas-discharge chamber of the laser. The water-charged store preferably consists of calcium chloride x $H_2O$.

Compared with the prior art, the invention has the further advantage that the hydrolysis products $Si(OH)_x$ or $B_2O_3$, etc., not used for the gas discharge of the laser do not occur in the gas-discharge chamber thereof because they are either solid or, due to their low vapour pressure, remain in the reaction vessels and thus cannot contaminate the laser or the laser tubes.

On the other hand, however, the invention makes it possible to carry out the hydrolysis directly in the gas-discharge chamber of the laser if proton donors suitable for this purpose are used, such as plexiglass.

An excimer laser according to the invention is characterized in that the hydrogen halide gas necessary for its gas discharge is not taken as such directly (possibly diluted) from a gas bottle but on the contrary within or outside the gas-discharge chamber of the laser a reaction is carried out in which the hydrogen halide gas for the gas discharge is formed.

The invention is thus based on the knowledge that the safety standard of the laser system can be substantially improved by not storing highly reactive hydrogen halide gas in the area of the laser but instead first generating the hydrogen halide gas by a chemical reaction by means of reactants which are substantially less reactive than hydrogen halide gas and the storing and handling of which is therefore far less problematical.

Particularly suitable as halogen donors are especially the following hydrolysable halides: $BCl_3$, $SiCl_4$, $POCl_3$, $(CH_3)_2SiCl_2$ and $(CH_3)SiCl_3$.

Possible proton donors in the sense of the invention are water, which can be present as such or as adsorbate, or in the form of crystal water, such as $CaCl_2xH_2O$, $Na_2B_4O_7.10H_2O$, $AlCl_3.6H_2O$, $Al_2O_3$ + remainder water, $Al_2Si_2O_7.2H_2O$, non-dried silica gel, $(NaPO_3)_3.H_2O$, $Na_2WO_4.2H_2O$.

The invention also has the advantage that the halogen donors may be stored in liquid state so that a large amount of halogen can be stored in a very small space. The same applies to the supply of water as hydrogen furnishing substance. This makes it possible to carry out a large number of gas fillings in the laser with relatively small reservoirs.

Hereinafter, examples of embodiment of the invention will be explained in detail with the aid of the drawings.

FIGS. 1 to 4 shows three different examples of embodiment of a gas supply for an excimer laser. In the Figures, corresponding components are denoted by the same reference numerals.

In a gas-discharge chamber 10 of an excimer laser a gas discharge is carried out using hydrogen halide. Apart from hydrogen halide gas other reactants take part in the gas discharge which are known per se and the supply of which will not be explained in detail here. The handling of these other gases is considerably simpler under the safety regulations to be observed.

In the examples of embodiment illustrated in the Figures as hydrogen halide gas HCl is provided so that for example an XeCl excimer laser is supplied with HCl.

The HCl for the gas discharge is to be made available in the gas-discharge chamber 10. For this purpose, the chamber 10 is provided with a manometer 12. In the example of embodiment according to FIG. 1 a Cl donor reacts with water vapour to form HCl. A halogen donor 14 is present in liquid form in a container. The temperature of the container is regulated by means of a temperature control 16 so that halogen donor vapour 18 forms above the liquid phase of the halogen donor 14. Possible halogen donors are for example: $BCl_3$, $SiCl_4$, $POCl_3$, $(CH_3)_2SiCl_2$ and $(CH_3)SiCl_3$.

The vapour pressure of the halogen donor in the gas phase 18 is adjusted by means of the temperature control 16 and the gaseous halogen donor can be transferred to a reaction chamber 20 by means of valves $V_1$ and $V_2$.

In a further container, water 22 is stored and is likewise initially present in liquid form; it can be transformed to the gas phase 24 by means of a temperature regulating device 34. For this purpose, a temperature measuring device 26 and a manometer 28 are provided.

Before setting the system shown in FIG. 1 and consisting of containers and conduits in operation for producing HCl, said system is evacuated by means of a vacuum pump (not shown). The conduit to the vacuum pump is denoted by the reference numeral 30.

To produce a new HCl filling of the chamber 10 of the laser the valve $V_5$ if first opened until a predetermined water vapour pressure is reached in the reaction chamber.

Thereafter the valve $V_5$ is closed again. Then, the valves $V_1$ and $V_2$ are opened so that a halogen donor can flow into the reaction space 20. By reaction in the reaction space 20 HCl forms up to a predetermined pressure $P_3$. Thereafter, the valves $V_1$ and $V_2$ are closed. After opening the valve $V_6$ hydrogen chloride gas flows into the chamber 10, a filter 32 being provided to separate particles. In the chamber 10 the desired partial pressure of HCl is set by means of the manometer 12.

It is also possible to fill the reaction space 20 initially with the halogen donor and then with water vapour.

Figure 2:
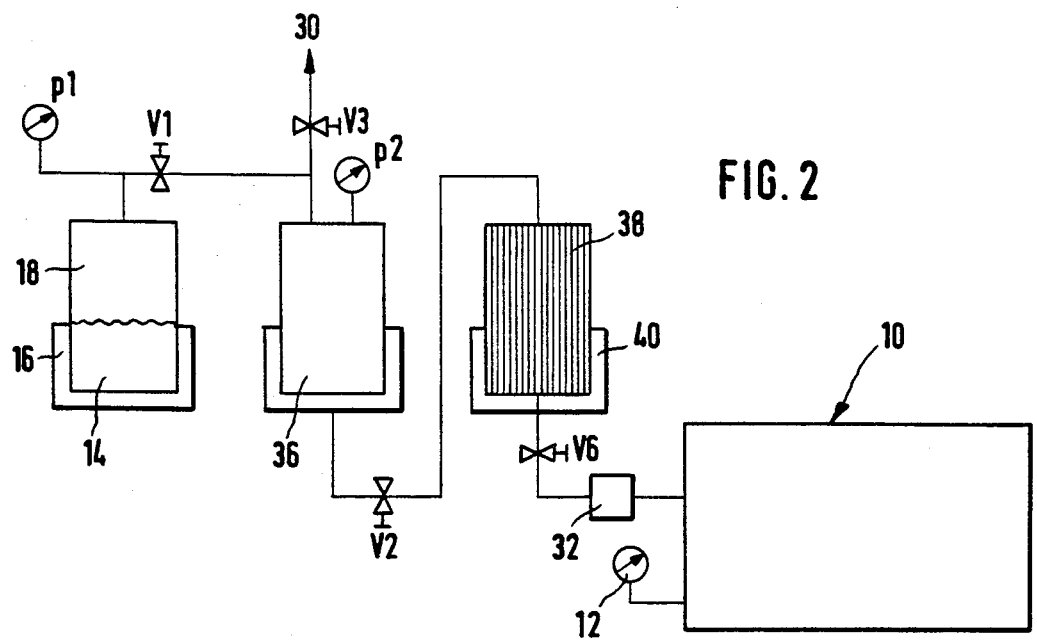

FIG. 2 shows a modification of the example of embodiment according to FIG. 1. In this case as well a halogen donor 14 is initially present in liquid phase and is transformed specifically into the gas phase 18 with the aid of a temperature control 16, a desired halogen donor vapour pressure $P_1$ being set.

Via the valve $V_1$ the gaseous halogen donor 18 is introduced into a supply volume 36. As this is done, the valve $V_3$ to the vacuum pump 30 is of course closed. In the supply volume 36 a desired pressure $P_2$ arises. Thereafter, the valve $V_1$ is closed and the valve $V_2$ opened. Halogen donor vapour flows out of the supply volume 36 into a water store 38, the temperature of which is regulated by means of a temperature control 40. The water store 38 contains crystal-water-containing material so that the halogen donor vapour reacts with the water. HCl is formed and after closing the valve $V_2$ is transferred via the valve $V_6$ and the filter 32 into the laser chamber 10. In this example of embodiment as well the aforementioned hydrolysable halides can be used as halogen donors. The water store 38 can preferably contain the aforementioned proton-active substances. The example of embodiment described above can be modified in that the supply volume 36 can be dispensed with if the volume of the water store 38 is large enough or if the surface of the proton-active substance is large enough.

Figure 3:
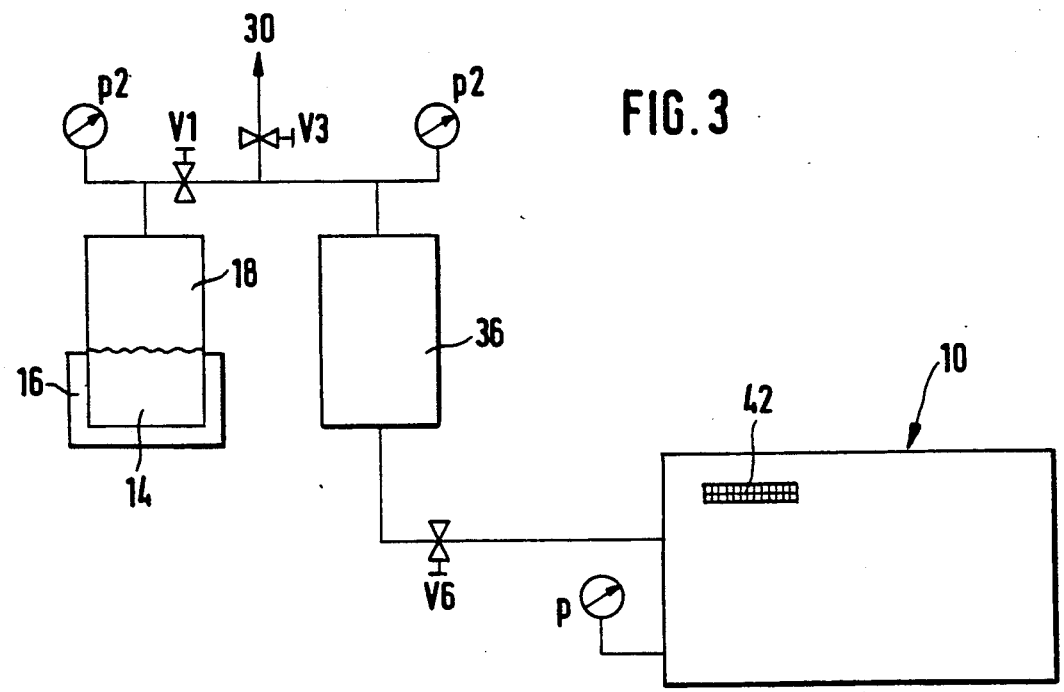

FIG. 3 shows an example of embodiment of the invention in which a water-containing substance is used directly in the gas-discharge chamber 10. The halogen donor 14 is again transformed specifically into the gas phase 18 by means of a temperature control 16 and transferred via the valve $V_1$ to the supply volume 36 until the desired partial pressure $P_2$ is reached there. Via the valve $V_6$ the gaseous halogen donor is transferred to the gas-discharge chamber 10 of the laser, where a water-containing substance 42 is disposed with which the halogen donor reacts to form HCl. As water-containing substance 42, for example, plexiglass, epoxy resins or the like may be used, as well as the proton-active substances mentioned above.

Figure 4:
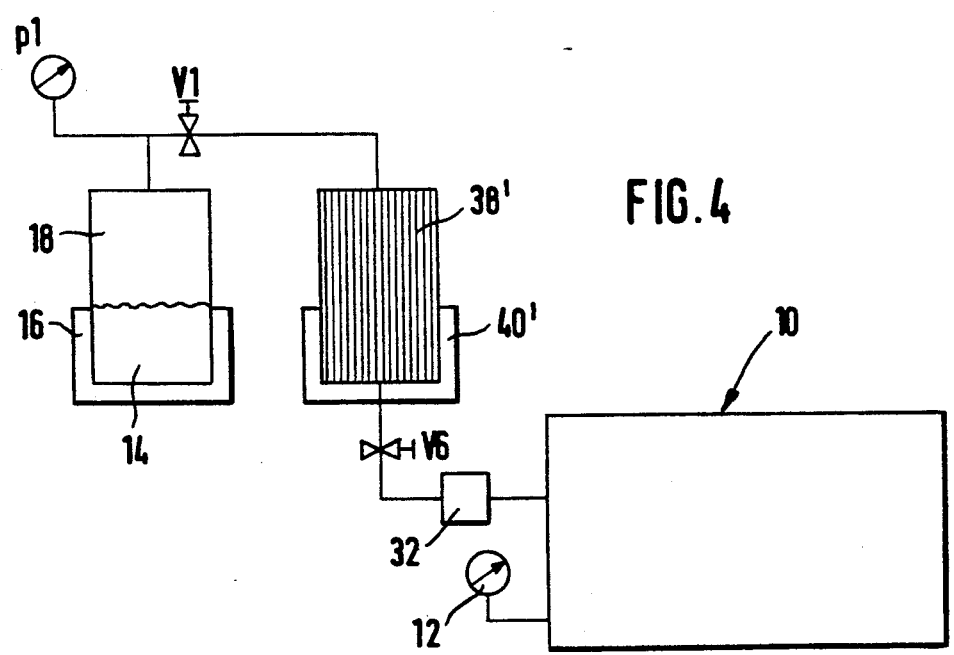

FIG. 4 shows a particularly preferred example of embodiment of the invention which is substantially simplified compared with the example of embodiment according to FIG. 2. In this example of embodiment in accordance with FIG. 4 $SiCl_4$ can be chosen as halogen donor and is transformed thermally to the gas phase 18. By means of the valve $V_1$ the $SiCl_4$ vapour is led via a water-charged store 38' which is brought by means of a temperature control device 40' to a predetermined temperature. By suitable choice of the reactants a temperature control device can also be dispensed with if it is ensured that room temperature (between 15°–45°) can usually be maintained in operation. The water-charged store may consist of calcium chloride x $H_2O$. The $SiCl_4$ gas flowing over the water-charged store is hydrolysed so that HCl gas is formed which is transferred directly via the valve $V_6$ and possibly the filter 32 as well as possibly via a collection volume (not shown) into the gas-discharge chamber 10 of the laser. To ensure complete hydrolysing, it is advisable for the $SiCl_4$ gas to remain for a few minutes in the store.

The collecting volume mentioned above is not shown in the Figures. In the arrangement according to FIG. 4 the collecting volume may be inserted into the conduit between the filter 32 and the laser chamber 10, a respective valve being arranged before and after the collecting volume in the flow direction.

We claim:

1. In an excimer laser having a chamber (10) in which a gas discharge is carried out with participation of hydrogen chloride (HCl), the improvement comprising means (14, 16, 18, 20, 22, 24; 36, 38; 38', 40') outside the chamber (10) for performing a hydrolysis of a halide for producing the hydrogen chloride (HCl).

2. The excimer laser according to claim 1 in which said means include a reaction chamber (20) for the production of HCl and a filter (32) in a conduit between the reaction chamber (20) and the chamber (10).

3. A method for producing hydrogen chloride (HCl) for a gas discharge in a laser chamber (10) comprising performing a hydrolysis of a halide outside the chamber (10) to produce the hydrogen chloride (HCl).

4. The method according to claim 3 wherein the hydrolysis of the performing step is carried out in homogeneous liquid phase.

5. The method according to claim 3 wherein an inorganic halide is used in the performing step.

6. Method according to claim 3 wherein the halide of the performing step reacts in vapor form with a hydrolyzing substance to liberate HCl.

7. The method according to claim 3 wherein the hydrolysis of the performing step is carried out in homogeneous liquid phase.

* * * * *